US010527522B2

(12) United States Patent
Jino et al.

(10) Patent No.: US 10,527,522 B2
(45) Date of Patent: Jan. 7, 2020

(54) MISFIRE DETERMINATION DEVICE AND MISFIRE DETERMINATION METHOD OF INTERNAL COMBUSTION ENGINE

(71) Applicant: KAWASAKI JUKOGYO KABUSHIKI KAISHA, Kobe-shi, Hyogo (JP)

(72) Inventors: Kenichi Jino, Himeji (JP); Katsumi Sobakiri, Takatsuki (JP); Shinichi Kuratani, Kobe (JP)

(73) Assignee: KAWASAKI JUKOGYO KABUSHIKI KAISHA, Kobe-shi, Hyogo (JP)

(*) Notice: Subject to any disclaimer, the term of this patent is extended or adjusted under 35 U.S.C. 154(b) by 187 days.

(21) Appl. No.: 15/803,627

(22) Filed: Nov. 3, 2017

(65) Prior Publication Data
US 2018/0128712 A1 May 10, 2018

(30) Foreign Application Priority Data
Nov. 9, 2016 (JP) .................................. 2016-218867

(51) Int. Cl.
*G01M 15/11* (2006.01)
(52) U.S. Cl.
CPC .................................. *G01M 15/11* (2013.01)
(58) Field of Classification Search
CPC .................................................... G01M 15/11
USPC ................ 73/114.02, 114.03, 114.04, 114.05
See application file for complete search history.

(56) References Cited

U.S. PATENT DOCUMENTS

| | | | | |
|---|---|---|---|---|
| 5,222,392 A | * | 6/1993 | Baba | F02D 41/22 73/114.03 |
| 5,361,629 A | * | 11/1994 | McCombie | G01M 15/11 701/110 |
| 5,499,537 A | * | 3/1996 | Nakayama | G01M 15/11 701/111 |
| 5,539,644 A | * | 7/1996 | Ichikawa | G01M 15/11 123/436 |
| 5,561,600 A | * | 10/1996 | McCombie | G01M 15/11 123/436 |

(Continued)

FOREIGN PATENT DOCUMENTS

JP    H09112334 A    4/1997

*Primary Examiner* — Eric S. McCall
(74) *Attorney, Agent, or Firm* — Alleman Hall Creasman & Tuttle LLP

(57) ABSTRACT

A misfire determination device of an internal combustion engine, includes an angular velocity obtaining section which obtains two crank angular velocities corresponding to two crank angular positions, respectively, which are set between a range which is around a first compression top dead center and a range which is around a second compression top dead center, in which the first compression top dead center is a compression top dead center of a determination target cylinder, and the second compression top dead center is the compression top dead center of a next ignition cylinder in which ignition is performed next to the ignition performed in the determination target cylinder; and a misfire determination section which determines whether or not misfire has occurred in the determination target cylinder based on a result of comparing a deviation between the two crank angular velocities to a predetermined misfire determination threshold.

9 Claims, 9 Drawing Sheets

(56) References Cited

U.S. PATENT DOCUMENTS

| | | | | |
|---|---|---|---|---|
| 5,728,941 A | * | 3/1998 | Yamamoto | G01M 15/11 |
| | | | | 123/436 |
| 5,819,197 A | * | 10/1998 | Fiaschetti | G01M 15/11 |
| | | | | 701/110 |
| 5,824,890 A | * | 10/1998 | La Palm | G01M 15/11 |
| | | | | 73/114.04 |
| 2004/0144165 A1 | * | 7/2004 | Yamada | G01M 15/11 |
| | | | | 73/114.06 |

* cited by examiner

MISFIRE DETERMINATION DEVICE AND MISFIRE DETERMINATION METHOD OF INTERNAL COMBUSTION ENGINE

CROSS-REFERENCE TO RELATED APPLICATION

This application claims priority to and the benefit of Japanese Patent Application No. 2016-218867 filed on Nov. 9, 2016, the entire disclosure of which is incorporated herein by reference.

BACKGROUND OF THE INVENTION

1. Field of the Invention

The present invention relates to a device and method for determining a misfire in an internal combustion engine.

2. Description of the Related Art

In the present description, a compression top dead center will be sometimes simply referred to as "TDC." "Before TDC" will be sometimes simply referred to as "BTDC". "After TDC" will be sometimes simply referred to as "ATDC". A crank angular position which is advanced by θ degrees with respect to the TDC as a reference will be sometimes simply referred to as "θ degrees BTDC". A crank angular position which is retarded by θ degrees with respect to the TDC as the reference will be sometimes simply referred to as "θ degrees ATDC".

A "determination target cylinder" is a cylinder for which misfire determination is to be performed. A "previous ignition cylinder" is a most recent cylinder in which ignition has been performed, before the ignition is performed in the determination target cylinder. A "next ignition cylinder" is a cylinder in which the ignition will be performed next to (after) the ignition performed in the determination target cylinder. In the case of a single cylinder engine, the determination target cylinder, the previous ignition cylinder, and the next ignition cylinder are the same cylinder. In contrast, in the case of a multi-cylinder engine, the determination target cylinder is different from the previous ignition cylinder, and is different from the next ignition cylinder.

An exemplary vehicle equipped with an engine as a driving power source includes a misfire determination device which determines whether or not a misfire has occurred. "JP H09-112334 A" discloses a device in which a crank angular velocity in a misfire determination interval set for each of cylinders is calculated in succession, and a present value of the crank angular velocity is compared to a previous value of the crank angular velocity. The present value is the crank angular velocity in the misfire determination interval of the determination target cylinder. The previous value is the crank angular velocity in the misfire determination interval of the previous ignition cylinder. In a case where a difference between the present value and the previous value exceeds a misfire determination value, it is determined that the misfire has occurred in the determination target cylinder.

In a low engine speed range, the misfire determination interval is set to an angular width of 145 degrees ATDC to 235 degrees ATDC with respect to the TDC of the determination target cylinder, and the crank angular velocity in this angular width is used as the present value.

The previous value is the angular width of 145 degrees ATDC to 235 degrees ATDC with respect to the TDC of the previous ignition cylinder as a reference. In "JP H09-112334 A", the misfire determination device is applied to a four-cylinder engine in which explosion occurs at equal (regular) intervals. Therefore, the angular width of 145 degrees ATDC to 235 degrees ATDC with respect to the TDC of the previous ignition cylinder as a reference is equal to the angular width of 35 degrees BTDC to 55 degrees ATDC with respect to the TDC of the determination target cylinder as a reference.

235 degrees ATDC conforms to 55 degrees ATDC with respect to the TDC of the next ignition cylinder, and is significantly retarded with respect to the TDC of the next ignition cylinder. In a case where normal combustion is performed in the next ignition cylinder, a crankshaft may be being accelerated due to push down of a piston by a combustion gas in the next ignition cylinder, at 235 degrees ATDC. A parameter used to determine whether or not the misfire has occurred is affected by a combustion state of a cylinder different from the determination target cylinder. For this reason, misfire determination accuracy may be reduced.

SUMMARY OF THE INVENTION

In view of the above, an object of the present invention is to improve a misfire determination accuracy.

According to an aspect of the present invention, a misfire determination device of an internal combustion engine, comprises an angular velocity obtaining section which obtains two crank angular velocities corresponding to two crank angular positions, respectively, which are set between a range which is around a first compression top dead center and a range which is around a second compression top dead center, in which the first compression top dead center is a compression top dead center of a determination target cylinder, and the second compression top dead center is the compression top dead center of a next ignition cylinder in which ignition is performed next to the ignition performed in the determination target cylinder; and a misfire determination section which determines whether or not misfire has occurred in the determination target cylinder based on a result of comparing a deviation between the two crank angular velocities to a predetermined misfire determination threshold.

In accordance with this configuration, the deviation between the two crank angular velocities is used to determine whether or not the misfire has occurred in the determination target cylinder, and the two crank angular velocities are obtained at the points between the range which is around the TDC of the determination target cylinder and the range which is around the TDC of the next ignition cylinder. This makes it possible to prevent a situation in which the combustion state of the cylinder which is other than the determination target cylinder affects the parameter (e.g., the crank angular velocity) used to determine whether or not the misfire has occurred in the determination target cylinder. In other words, the combustion state of the determination target cylinder affects more the parameter used to determine whether or not the misfire has occurred in the determination target cylinder. Therefore, accuracy of determination of whether or not the misfire has occurred in the determination target cylinder can be improved.

The misfire determination device of the internal combustion engine may further comprises: a range determiner section which determines whether or not an engine speed lies in a low engine speed range, wherein in a case where the range determiner section determines that the engine speed lies in the low engine speed range, the angular velocity obtaining section may obtain crank angle change rates in a first crank angular width, as the two crank angular velocities, and the misfire determiner section may determine whether or not the misfire has occurred in the determination target cylinder, based on a result of comparing the deviation between the two crank angular velocities to a predetermined low engine speed misfire determination threshold, and wherein in a case where the range determiner section determines that the engine speed does not lie in the low engine speed range, the angular velocity obtaining section may obtain crank angle change rates in a second crank angular width longer than the first crank angular width, as the two crank angular velocities, and the misfire determiner section may determine whether or not the misfire has occurred in the determination target cylinder, based on a result of comparing the deviation between the two crank angular velocities to a predetermined high engine speed misfire determination threshold.

The angular velocity obtaining section may obtain the two crank angular velocities based on information obtained after the first compression top dead center.

The two crank angular positions may include a first crank angular position and a second crank angular position which is retarded with respect to the first crank angular position, and the second crank angular position may be set to a point in a range which is around the second compression top dead center.

The two crank angular positions may include a first crank angular position and a second crank angular position which is retarded with respect to the first crank angular position, and the second crank angular position may be set to a point which is close to the crank angular position at which the crank angular velocity is highest in a case where normal combustion has been performed in the determination target cylinder, the point being in a range between the first compression top dead center and the second compression top dead center.

The two crank angular positions may include a first crank angular position and a second crank angular position which is retarded with respect to the first crank angular position, and the first crank angular position may be set to a point in the range which is around the first compression top dead center.

Each of the two crank angular velocities may be derived as a change over time of the crank angular position for a passage of a minimum crank angular width which is obtainable.

According to another aspect of the present invention, a misfire determination method of an internal combustion engine, comprises obtaining two crank angular velocities corresponding to two crank angular positions, respectively, which are set between a range which is around a first compression top dead center and a range which is around a second compression top dead center, in which the first compression top dead center is a compression top dead center of a determination target cylinder, and the second compression top dead center is the compression top dead center of a next ignition cylinder in which ignition is performed next to the ignition performed in the determination target cylinder; and determining that misfire has occurred in the determination target cylinder in a case where a deviation between the obtained two crank angular velocities is equal to or greater than a predetermined misfire determination threshold.

In accordance with the present invention, misfire determination accuracy can be improved.

The above and further objects, and advantages of the invention will more fully be apparent from the following detailed description with reference to the accompanying drawings.

DETAILED DESCRIPTION OF THE EMBODIMENTS

Hereinafter, the embodiments will be described with reference to the accompanying drawings.

Embodiment 1

[Engine]

Figure 1:
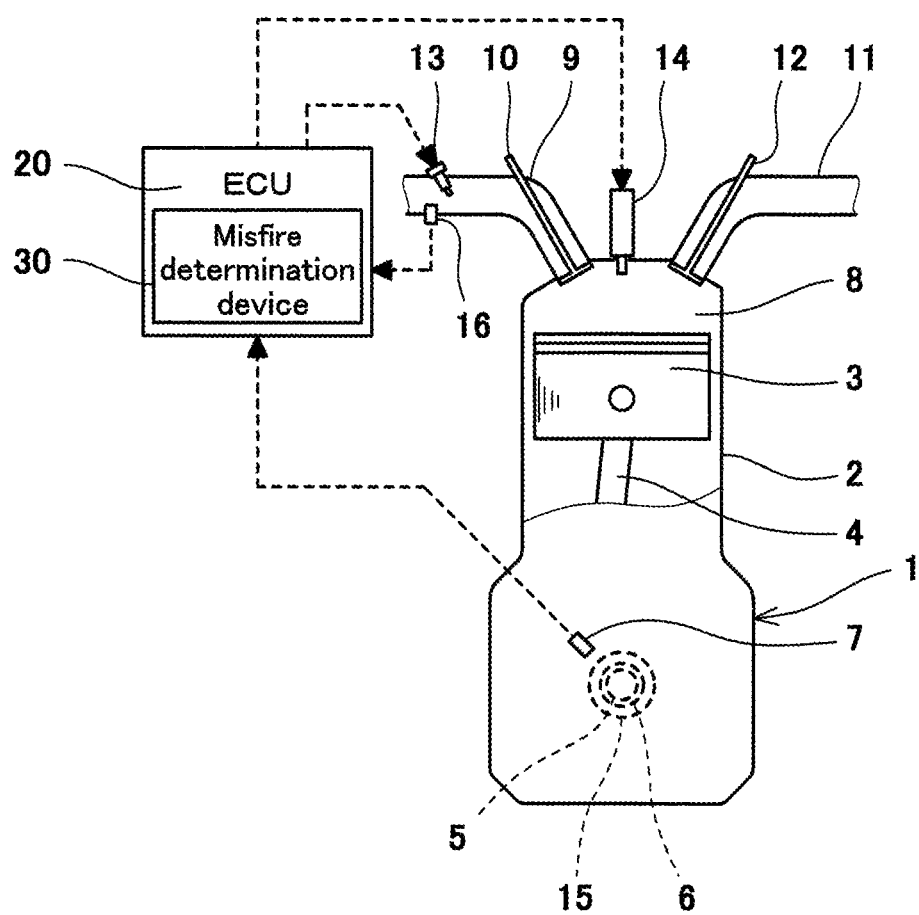
FIG. 1 is a conceptual view showing the configuration of an engine according to Embodiment 1.

Referring now to FIG. 1, an internal combustion engine 1 (hereinafter will be referred to as engine 1") includes at least one cylinder 2. Although FIG. 1 shows only one cylinder 2, the remaining cylinders are configured in the same manner in the case of the multi-cylinder engine. The engine 1 includes a piston 3 which is reciprocatingly inserted into the cylinder 2. The piston 3 is coupled to a crankshaft 5 via a connecting rod 4.

The engine 1 is provided with a fly wheel 6 which increases an inertia moment of the crankshaft 5. The engine 1 is provided with a crank angle sensor 7 which detects a crank angular position (rotation position of the crankshaft 5). The fly wheel 6 and the crank angle sensor 7 may be provided on the crankshaft 5 as shown in FIG. 1. The fly wheel 6 may be built into a clutch coupled to the crankshaft 5 or a generator. The crank angle sensor 7 may be provided on another rotary member (e.g., valve driving camshaft) rotated by the crankshaft 5.

For example, a combustion chamber 8 is provided above the piston 3. The combustion chamber 8 is in communication with an air-intake passage 9 via an intake valve 10 and in communication with an exhaust passage 11 via an exhaust valve 12. A throttle valve is provided in the air-intake passage 9 to adjust an air-intake amount.

The engine 1 is provided with an injector 13 and an ignition plug 14. The injector 13 injects fuel into the air-intake passage 9 or the combustion chamber 8. The ignition plug 14 generates a spark inside the combustion chamber 8 to ignite and combust an air-fuel mixture inside the combustion chamber 8. The injector 13 and the ignition plug 14 are controlled by an electronic control unit 20 (hereinafter will be referred to as "ECU 20"). The ECU 20 sets a fuel injection amount and an ignition timing depending on running states such as an engine speed and a throttle valve opening degree. An open period of the injector 13 of the engine E and an operation timing of the ignition plug 14 are controlled according to the set fuel injection amount and the set ignition timing, respectively.

The engine 1 is mounted in a vehicle and serves as a driving power source which generates driving power for rotating a wheel. An exhaust system of the engine 1 is provided with a ternary (three-way) catalyst for cleaning an exhaust gas. If a misfire in the engine 1 continues to be overlooked, then the ternary catalyst is overheated by an uncombusted gas and the cleaning ability of the ternary catalyst is degraded. To avoid such a situation, the vehicle includes a misfire determination device 30 which determines whether or not the misfire has occurred in the engine 1. In the present embodiment, the misfire determination device 30 is implemented by the ECU 20 mounted in the vehicle.

Figure 2:
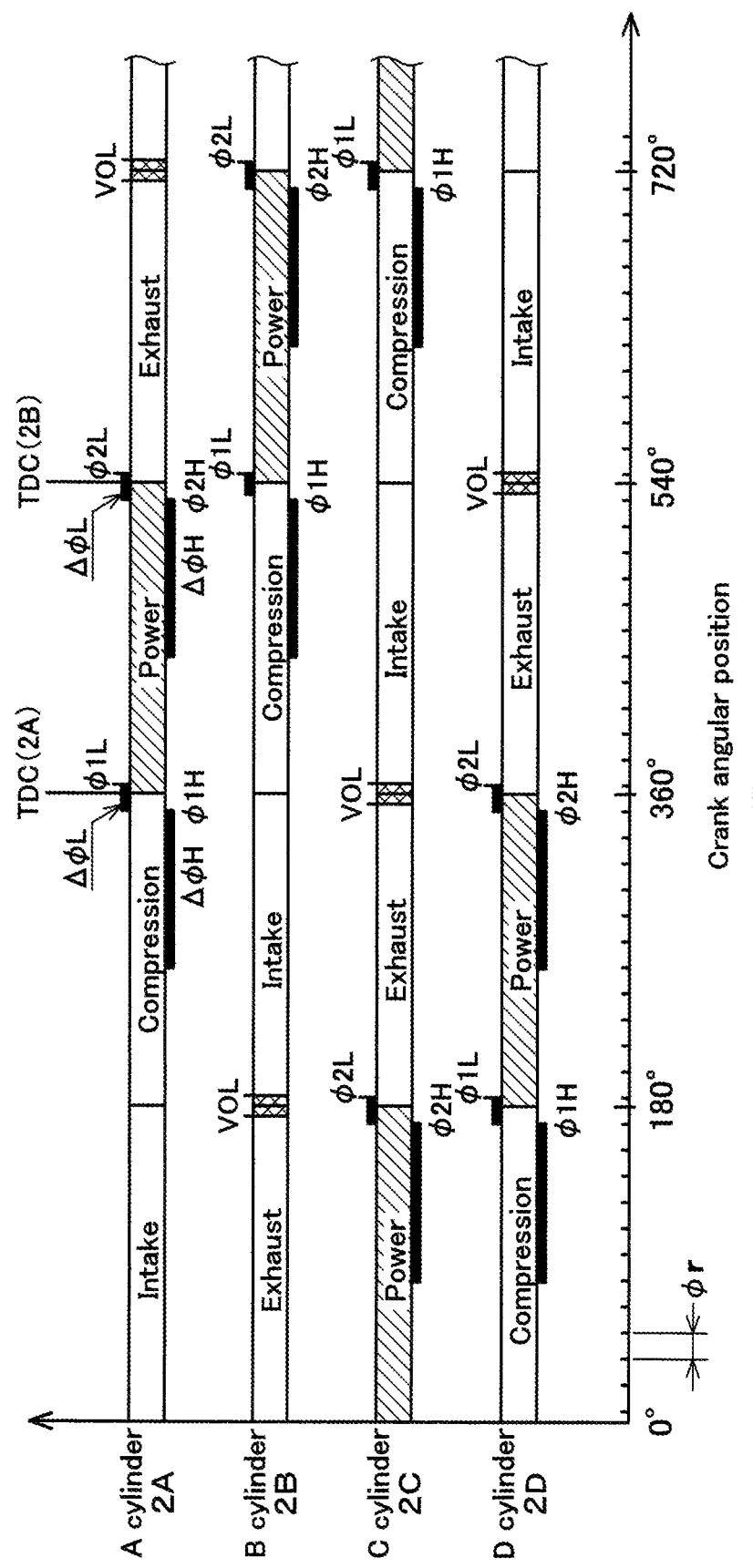
FIG. 2 is a graph showing a relation between a crank angular position and four strokes.

FIG. 2 is a graph showing a relation between a crank angular position and four strokes. The engine 1 is, for example, a four-cylinder engine, and includes an A cylinder 2A, a B cylinder 2B, a C cylinder 2C, and a D cylinder 2D.

The engine 1 is, for example, a four-stroke engine. While the crankshaft 5 is rotating 720 degrees, a series of operations in which each cylinder 2 takes in, compresses, and combusts the air-fuel mixture and exhausts a combustion gas, namely, "one engine cycle" is completed. The "one engine cycle" includes the four strokes which are an intake stroke, a compression stroke, a power (expansion) stroke, and an exhaust stroke. From start of each stroke to the end of this stroke, the crankshaft rotates 180 degrees.

For easier understanding of the description, it is assumed that a crank angular position in a state in which the A cylinder 2A is at an exhaust top dead center is 0 degree. The A cylinder 2A is at a compression bottom dead center when the crank angular position is 180 degrees. The A cylinder 2A is at a compression top dead center when the crank angular position is 360 degrees. The A cylinder 2A is at an exhaust bottom dead center when the crank angular position is 540 degrees.

The engine 1 is, for example, an engine in which explosion occurs at equal (regular) intervals. The TDCs of the four cylinders 2A to 2D are set at 180 degree intervals. When the crank angular position is 0 degree, the B cylinder 2B is at the exhaust bottom dead center, the C cylinder 2C is at the compression top dead center, and the D cylinder 2D is at the compression bottom dead center. Every time the crankshaft 5 rotates 180 degrees, ignition occurs in the order of the A cylinder, the B cylinder, the C cylinder, the D cylinder, the A cylinder, the B cylinder . . . .

The engine 1 employs, for example, valve overlap. In this case, in each of cylinders 2A to 2C, an open timing of the intake valve 10 is earlier than a close timing of the exhaust valve 12, and there is a period in which both of the intake valve 10 and the exhaust valve 12 are opened (see cross-hatched areas VOL in FIG. 2), in a range which is around the exhaust top dead center. This facilitates internal EGR (exhaust gas recirculation). As a result, the exhaust gas can be cleaned, and fuel efficiency can be improved. Alternatively, the engine 1 may employ a variable valve timing.

[Crank Angle Sensor]

Figure 3:
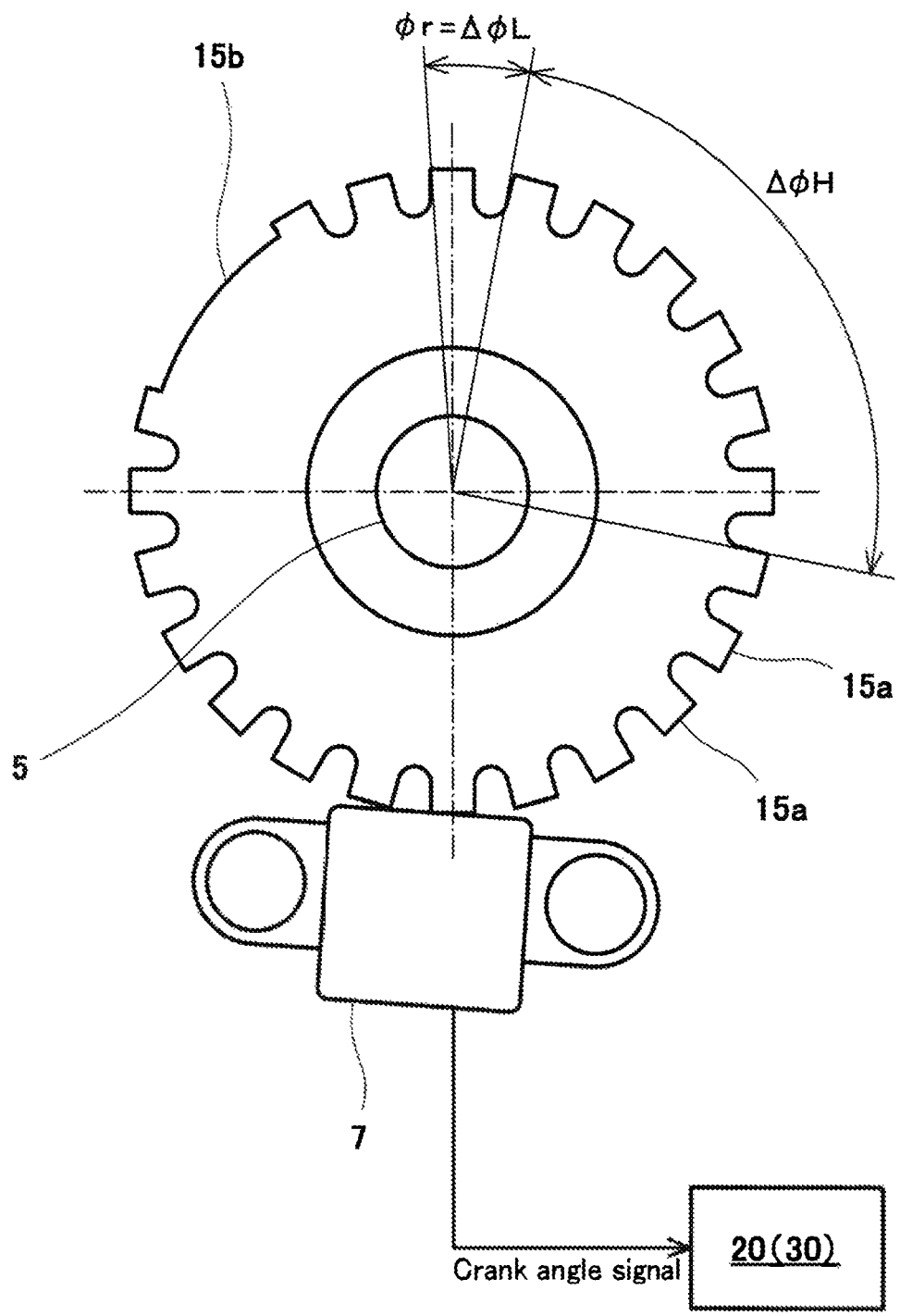
FIG. 3 is a view showing the configuration of a crank angle sensor.

Scale markings shown on a horizontal axis of FIG. 2 indicate an example of the crank angular position detected by the crank angle sensor 7 (see FIGS. 1 and 3). In the present embodiment, the crank angle sensor 7 detects the crank angular position as a discrete amount rather than a serial amount. A crank angular width defined by two adjacent scale markings indicates a minimum angular width which can be obtained by the misfire determination device 30, namely, a detection resolution $\varphi r$ of the crank angle sensor 7. The detection resolution $\varphi r$ may be set to a divisor of the crank angular width (180 degrees in the present example) between two successive (adjacent) TDCs. In the present embodiment, the detection resolution $\varphi r$ is 15 degrees. The crank angle sensor 7 detects 10 degrees BTDC and 5 degrees ATDC at points in a range which is around the TDC of each of the cylinders 2A to 2D. However, the detection resolution $\varphi r$ is not limited to 15 degrees.

In the present embodiment, the engine 1 is a four-cylinder four-stroke engine in which explosion occurs at equal (regular) intervals. Therefore, "170 degrees ATDC" with respect to the TDC of the A cylinder 2A corresponds to "10 degrees BTDC" with respect to the TDC of the B cylinder 2B in which the ignition is performed next. "185 degrees ATDC" with respect to the TDC of the A cylinder 2A corresponds to "5 degrees ATDC" with respect to the TDC of the B cylinder 2B.

As shown in FIG. 3, the crank angle sensor 7 faces a rotor 15 attached on the crankshaft 5 in a radial direction of the crankshaft 5. The rotor 15 has a gear shape when viewed from an axial direction of the crankshaft 5. The rotor 15 has on its outer periphery, a plurality of teeth 15a arranged at equal intervals in a circumferential direction thereof, with the crank angular width corresponding to the detection resolution $\varphi r$. It should be noted that the plurality of teeth 15a are not provided on the entire outer periphery and the rotor 15 has a non-tooth region 15b in which the teeth 15a are not arranged. While the crankshaft 5 is rotating, the crank angle sensor 7 outputs a crank angle signal at a time point when the crank angle sensor 7 faces the end surface (tooth tip surface) of each of the teeth 15a and ceases to output the crank angle signal at a time point when the crank angle sensor 7 faces a depressed surface (tooth root surface) between two adjacent teeth 15a. The crank angle sensor 7 outputs the crank angle signal in a pulse form every time the crankshaft 5 rotates by a predetermined crank angular width corresponding to the detection resolution $\varphi r$. Because of the presence of the non-tooth region 15b, the ECU 20 can recognize the reference angle of the crankshaft 5, and recognize to what degrees the crankshaft 5 has rotated from the reference angle.

[Ne Calculation, Ignition Timing Setting]

Figure 4:
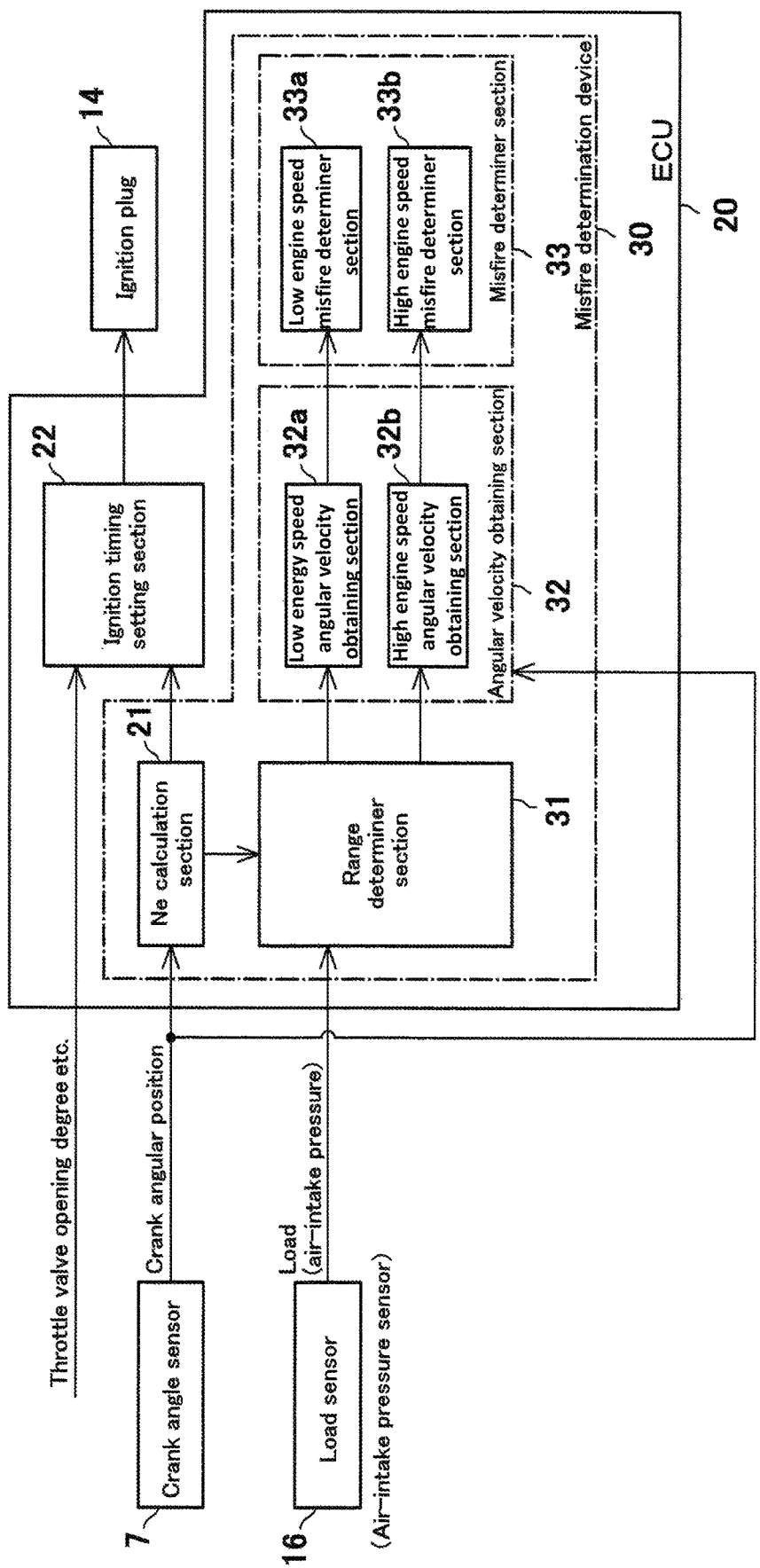
FIG. 4 is a conceptual view showing the configuration of a misfire determination device according to Embodiment 1.

As shown in FIG. 4, the crank angle sensor 7 outputs the crank angle signal to the ECU 20 or the misfire determination device 30. The ECU 20 includes an engine speed calculation section 21, and an ignition timing setting section 22.

The engine speed calculation section 21 derives an engine speed [rpm] based on the crank angle signal output from the crank angle sensor 7. The engine speed calculation section 21 obtains a numeric value of the engine speed by dividing a crank angular width (e.g., 360 degrees) predetermined to calculate the engine speed by time (can be measured by an internal clock of the ECU 20) taken for the crankshaft 5 to rotate by this crank angular width. The ECU 20 performs calculation for obtaining the engine speed once in every predetermined sampling periods (e.g., every 5 ms).

The ignition timing setting section 22 sets the ignition timing based on the engine speed derived by the engine speed calculation section 21 and other running states (e.g., throttle valve opening degree). The ignition timing does not always conform to the TDC, and is set to the crank angular position in a range which is around the TDC. It should be noted that the ignition timing varies depending on the engine speed and other running states.

[Misfire Determination Device]

The misfire determination device 30 includes a range determiner section 31, an angular velocity obtaining section 32, and a misfire determiner section 33. The misfire determination device 30 determines whether or not the misfire has occurred in each of the four cylinders 2A to 2D, while changing the determination target cylinder.

The angular velocity obtaining section 32 obtains two crank angular velocities $\omega 1$, $\omega 2$, corresponding to two crank angular positions $\varphi 1$, $\varphi 2$, respectively, which are set to points between a range which is around a first TDC and a range which is around a second TDC (points between a certain crank angular width including the first TDC and a certain crank angular width including the second TDC). The first TDC is the TDC of the determination target cylinder, and the second TDC is the TDC of the next ignition cylinder. For example, in a case where the A cylinder 2A is the determination target cylinder, the B cylinder 2B is the next ignition cylinder. In this case, the two crank angular positions $\varphi 1$, $\varphi 2$ are set between the range which is around the TDC of the A cylinder 2A and the range which is around the TDC of the B cylinder 2B. In a case where the B cylinder 2B is the determination target cylinder, the C cylinder 2C is the next ignition cylinder.

In other words, the angular velocity obtaining section 32 obtains the two crank angular velocities $\omega 1$, $\omega 2$, corresponding to the two crank angular positions $\varphi 1$, $\varphi 2$, respectively, which are set between a first ignition timing which is the ignition timing of the determination target cylinder, and a second ignition timing which is the ignition timing of the next ignition cylinder.

Hereinafter, of the two crank angular positions $\varphi 1$, $\varphi 2$, an advanced crank angular position will be referred to as a "first crank angular position $\varphi 1$" and a retarded angular position will be referred to as a "second crank angular position $\varphi 2$". An angular velocity corresponding to the first crank angular position $\varphi 1$ will be referred to as a "first crank angular velocity $\omega 1$", and an angular velocity corresponding to the second crank angular position $\varphi 2$ will be referred to as a "second crank angular velocity $\omega 2$".

The misfire determiner section 33 compares a deviation $\Delta \omega$ between the two crank angular velocities $\omega 1$, $\omega 2$ obtained by the angular velocity obtaining section 32 to a predetermined misfire determination threshold TH. The misfire determiner section 33 determines whether or not the misfire has occurred in the determination target cylinder based on a result of the comparison. As will be described later, if the misfire has occurred in the determination target cylinder, the second crank angular velocity $\omega 2$ becomes smaller than the first crank angular velocity $\omega 1$.

For example, the deviation $\Delta \omega$ between the two crank angular velocities $\omega 1$, $\omega 2$ is derived by subtracting the second crank angular velocity $\omega 2$ from the first crank angular velocity $\omega 1$ ($\Delta \omega = \omega 1 - \omega 2$). In this case, if the misfire has occurred, the deviation $\Delta \omega$ takes a positive value. Correspondingly, the predetermined misfire determination threshold TH is set to a positive value. In a case where the deviation $\Delta \omega$ having the positive value is equal to or greater than the predetermined misfire determination threshold TH having the positive value, the misfire determiner section 33 determines that the misfire has occurred in the determination target cylinder. The predetermined misfire determination threshold TH can be obtained in advance (at a stage of design of the misfire determination device 30) by reproducing a misfire state in an experiment, and is preset in the misfire determination device 30.

Figure 5:
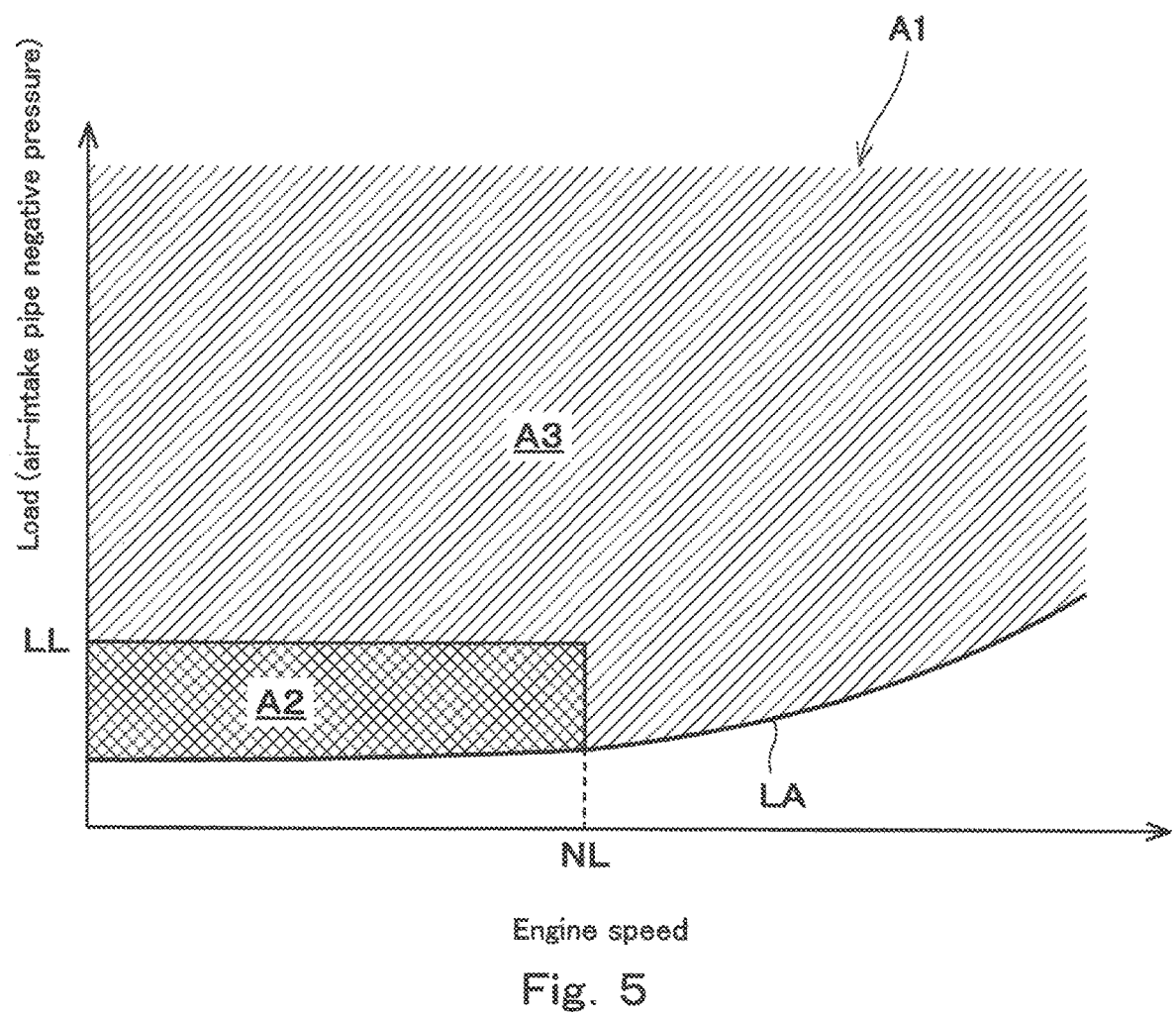
FIG. 5 is a graph showing a determination range and a low engine speed range.

The range determiner section 31 determines whether or not the running state of the engine 1 lies in a determination range A1 (see FIG. 5). In a case where the range determiner section 31 determines that the running state of the engine 1 lies in the determination range A1, the angular velocity obtaining section 32 and the misfire determiner section 33 operate as will be described below, to determine whether or not the misfire has occurred in the determination target cylinder.

As shown in FIG. 5, for example, the determination range A1 is defined by the engine speed and a load and expressed as a flat plane in a coordinate system in which a horizontal axis is the engine speed and a vertical axis is the load.

For example, the determination range A1 is defined as a line LA rising to the right within the above-described coordinate system and formed above the line LA. A part or whole of the line LA may be a positive torque line (curve showing a correspondence between the engine speed and the load in a state in which a transmission located between the engine 1 and a drive wheel is at a neutral position).

The determination range A1 includes at least two engine speed ranges which are a low engine speed range A2 (cross-hatched area in FIG. 2) in which the engine speed is equal to or lower than a predetermined engine speed NL, and an engine speed range A3 other than the low engine speed range A2. The range determiner section 31 determines whether or not the engine speed derived by the engine speed calculation section 21 lies in the low engine speed range A2. The low engine speed range A2 may also be a low load range in which the load is equal to or less than a predetermined load LL. In this example, the low engine speed range A2 is a range in which the engine speed is low and the load is low.

The misfire determination device 30 is connected to a sensor for detecting the load of the engine 1 or a parameter related to the load of the engine 1 to allow the range determiner section 31 to perform the range determination process. The load can be replaced by a pressure (negative pressure) in an air-intake pipe constituting the air-intake passage 9. Therefore, a suitable example of such a sensor may be an air-intake pressure sensor 16 (see FIG. 1) which detects the pressure in the air-intake pipe.

Figure 6:
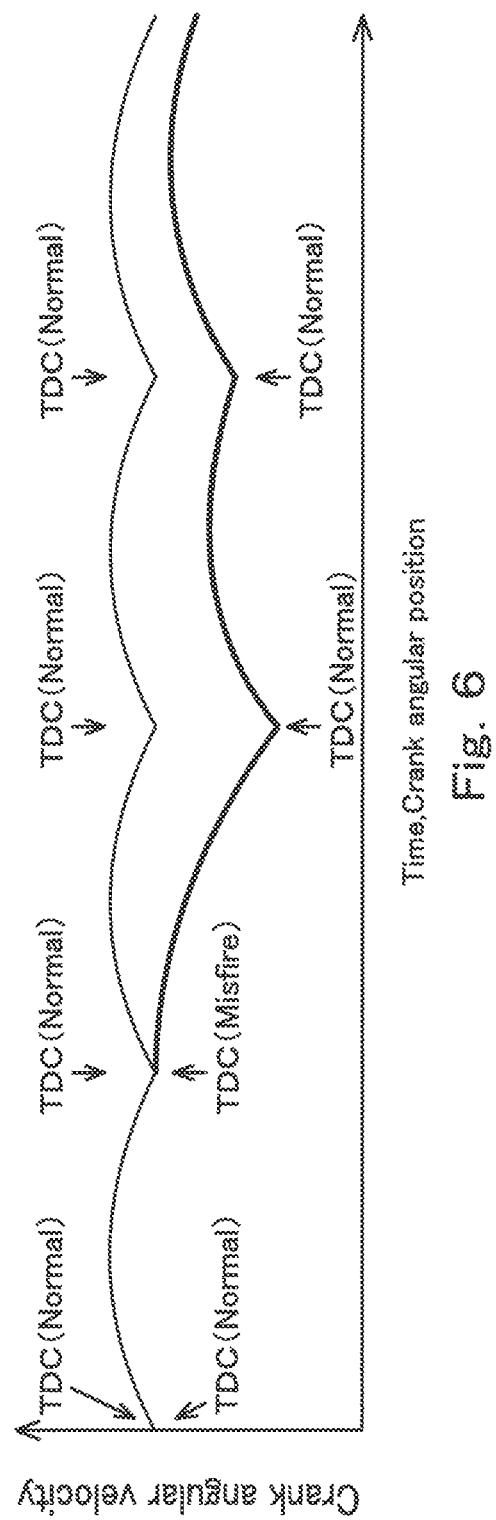
FIG. 6 is a conceptual view of a misfire determination principle.

FIG. 6 is a conceptual view showing a basic principle of the misfire determination process performed by the misfire determination device 30. In FIG. 6, a thin line conceptually indicates the time history of the crank angular velocity in a case where normal combustion is performed. In a case where the normal combustion continues, the crank angular velocity increases from a point in a range which is around the TDC of a specified cylinder and decreases thereafter. The crank angular velocity shifts in the same manner after a point in a range which is around the TDC of a next cylinder.

A solid line in FIG. 6 conceptually indicates the time history of the crank angular velocity in a case where the misfire has occurred. In a case where the misfire has occurred in a specified cylinder, the crank angular velocity decreases after a point in a range which is around the TDC of the specified cylinder in which the misfire has occurred. In a case where the normal combustion is performed in a next cylinder, the crank angular velocity starts to increases again. Such a trend is observed in both of a low engine speed range and a high engine speed range of the engine 1.

In view of the above, in the present embodiment, the misfire determination device 30 derives a deviation between two crank angular velocities which are obtained at points between a range which is around the TDC of a specified cylinder and a range which is around the TDC of another cylinder in which the ignition is performed next, and determines that the misfire has occurred in the specified cylinder when this deviation exceeds a threshold. However, as can be seen from FIG. 7, it is difficult to properly set the threshold for the low engine speed range.

Figure 7:
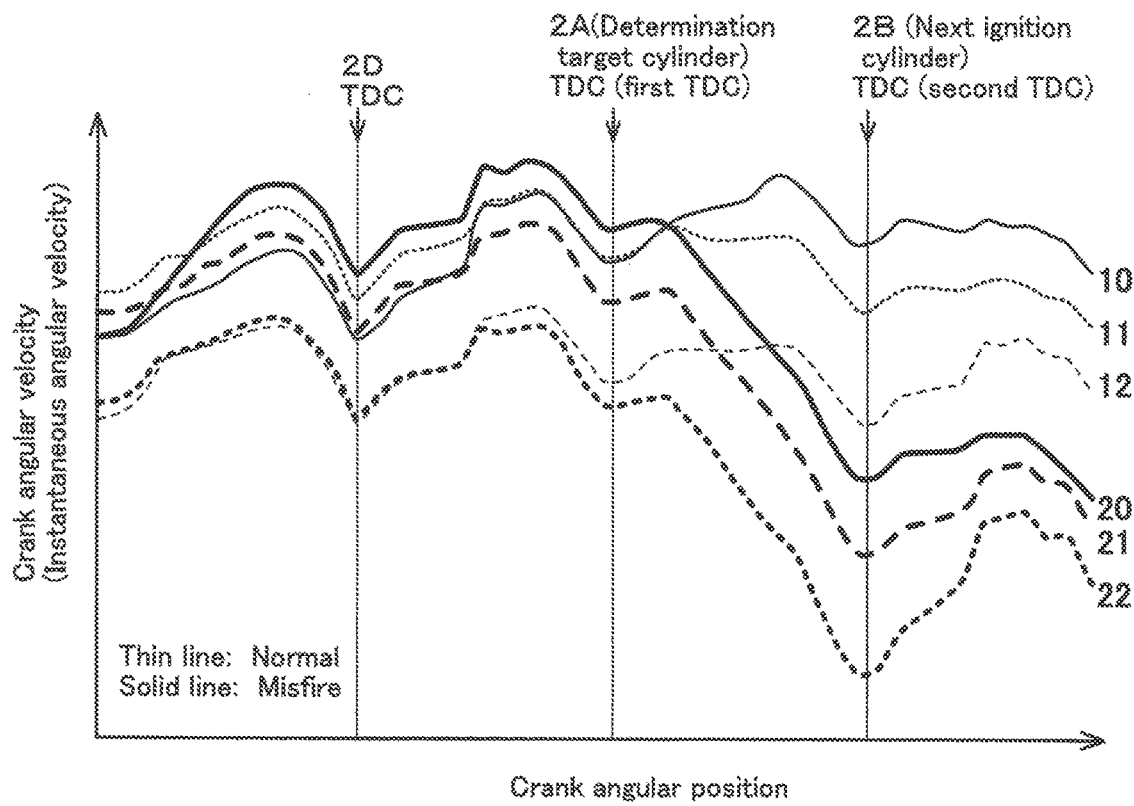
FIG. 7 is a graph showing time histories of crank angular velocities in a case where an engine speed lies in an idling speed range, in which bold lines indicate the crank angular velocities in a misfire state, and thin lines indicate the crank angular velocities in a normal combustion state.

FIG. 7 shows experiment data of the time histories of the crank angular velocities in a case where the engine 1 lies in an idling speed range which is an example of the low engine speed range A2, the experiment data being obtained by the present inventors.

In the low engine speed range A2, the crank angular velocity tends to be significantly non-uniform. In particular, in the case of a straddle vehicle such as a motorcycle, this non-uniformity is noticeable. In a lightweight vehicle such as the straddle vehicle, an accelerator response is regarded as important and the fly wheel 6 (see FIG. 1) is lightweight. A drive system mounted in the small and lightweight vehicle is tuned so that an inertia moment of the crankshaft 5 is reduced, or an angular acceleration rate and hence an angular velocity of the crankshaft 5 is changed with small torque.

In a case where the engine 1 employs valve overlap, the effects of the internal EGR on engine power torque increases and a torque increase amount as the effects of the internal EGR is non-uniform between the strokes, in the low engine speed range A2 (in particular, the low load range of the low engine speed range A2). For this reason, in the low engine speed range A2, even in a case where the normal combustion continues, the non-uniformity of the crank angular velocity is significant due to the effects of the internal EGR (and because of the fact that the crank angular velocity easily changes under small torque).

In the small and lightweight vehicle such as the motorcycle, the positive torque line shifts in a low load range. Therefore, small torque is sufficient for acceleration. In the low engine speed range A2, the positive torque line shifts in a very low load range. For this reason, in the low engine speed range A2, in particular the low load range, a difference in the crank angular velocity and hence the engine speed, between a power (expansion) stroke in which the air-fuel mixture has been normally combusted and the torque could be provided to the crankshaft 5 and a power stroke in which the misfire has occurred and the torque could not be provided to the crankshaft 5, is not great.

Because of the fact that the engine speed is unstable even in the case of the normal combustion and that a difference in the engine speed between the case of the normal combustion and the case of the misfire is not great, it is further difficult to determine whether or not the misfire has occurred, in the low engine speed range A2 (in particular, the low load range of the low engine speed range A2). For this reason, it is difficult to properly set the threshold used to accurately distinguish between the normal combustion and the misfire.

This will be described in more detail with reference to FIG. 7. For example, at the crank angular position just after 5 degrees ATDC, the crank angular velocity (see a line 12 which takes a minimum value) obtained in the normal combustion state is sometimes lower than the crank angular velocity (see a line 20 which takes a maximum value) obtained in the misfire state. Also, at the crank angular position just before the 5 degrees ATDC, the crank angular velocity (see the line 12 which takes the minimum value) obtained in the normal combustion state is sometimes not so high with respect to the crank angular velocity obtained in the misfire state (see the line 20 which takes the maximum value). For this reason, it is difficult to properly set the threshold used to precisely distinguish between the normal combustion and the misfire, and a misdetermination tends to occur.

In contrast, a plurality of bold lines indicating the time histories of the crank angular velocities obtained in the misfire state are substantially parallel to each other in a vertical axis direction of the coordinate system, in a range between the TDC of the cylinder in which the misfire has occurred and the TDC of the cylinder in which the ignition is performed next. In other words, even in a case where the crank angular velocities at the TDC of the cylinder in which the misfire has occurred are different, the changes over time of the crank angular velocities, which occur thereafter, have substantially the same trend.

Figure 8:
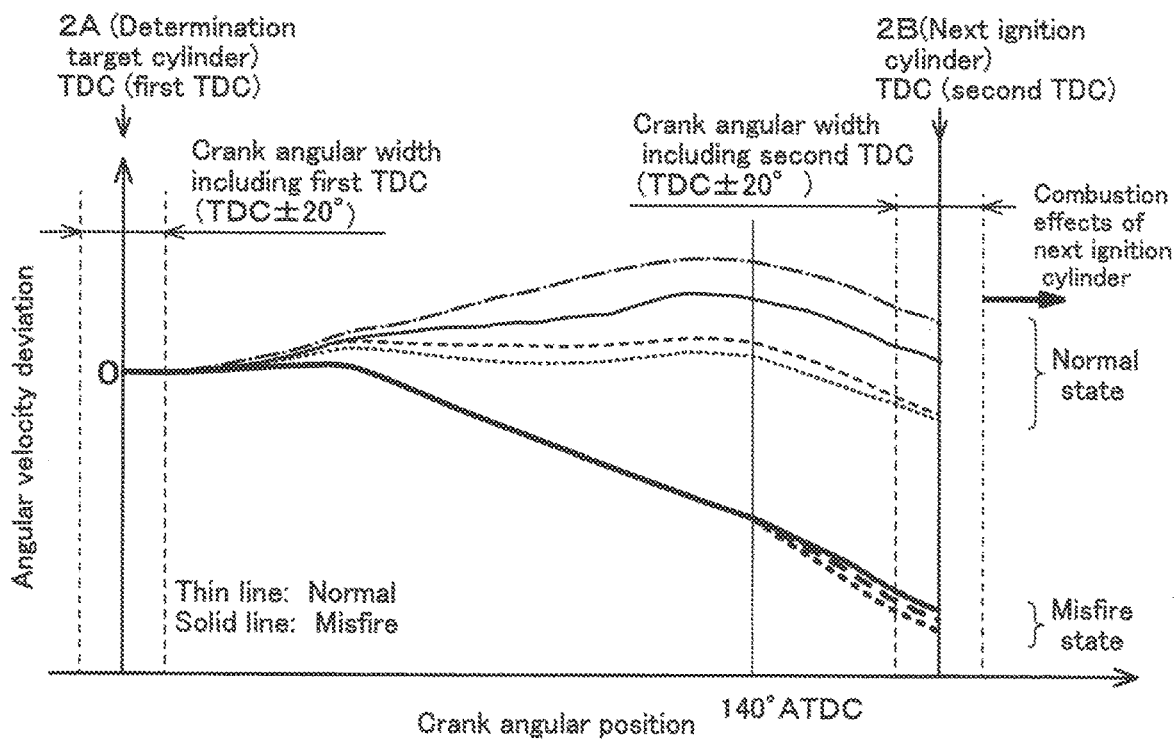
FIG. 8 is a graph showing time histories of angular velocity deviations after a first TDC in a case where the engine speed lies in the idling speed range, in which bold lines indicate the crank angular velocities in the misfire state, and thin lines indicate the crank angular velocities in the normal combustion state.

As shown in FIG. 8, in a case where the misfire has occurred in a specified cylinder, change amounts (angular velocity deviations) of the crank angular velocities from the crank angular velocity at the TDC of the specified cylinder in which the misfire has occurred shift in the same manner thereafter, irrespective of the magnitude of the crank angular velocity at the TDC of the cylinder in which the misfire has occurred. In summary, in the coordinate system in which the horizontal axis is the time and the vertical axis is the angular velocity deviation, the diagrammatic drawings representing the time histories of the crank angular velocity deviations substantially overlap with each other and are highly identical, irrespective of the magnitude of the crank angular velocity at the TDC of the cylinder in which the misfire has occurred.

The diagrammatic drawings representing the time histories of the crank angular velocity deviations in the normal combustion state are less identical than those in the misfire state, due to the above-described non-uniformity caused by the effects of the internal EGR. However, the angular velocity deviations in the normal combustion state have values which are relatively higher than those of the angular velocity deviations in the misfire state. In particular, in a range which is around the TDC of the cylinder in which the ignition is performed next to (after) the ignition performed in the cylinder in which the misfire has occurred, the angular velocity deviations in the normal combustion state do not fall below the angular velocity deviations in the misfire state.

The "crank angular velocity" depicted on the vertical axis of FIG. 7 is an "instantaneous angular velocity". In the present embodiment, the "instantaneous angular velocity" is defined as the angular velocity of the crankshaft 5 which is derived by dividing the crank angular width (e.g., 15 degrees shown in FIG. 3) corresponding to the detection resolution φr of the crank angle sensor 7 by time taken for the crankshaft 5 to rotate by this crank angular width. The "angular velocity deviation" depicted on the vertical axis of FIG. 8 is a change amount of the instantaneous angular velocity.

[Low Engine Speed/High Engine Speed Angular Velocity Obtaining Section, Low Engine Speed/High Engine Speed Misfire Determiner Section]

Turning back to FIG. 4, the angular velocity obtaining section 32 includes a low engine speed angular velocity obtaining section 32a and a high engine speed angular velocity obtaining section 32b, and the misfire determiner section 33 includes a low engine speed misfire determiner section 33a and a high engine speed misfire determiner section 33b.

In a case where the range determiner section 31 determines that the running state of the engine 1 lies in the low engine speed range A2, the low engine speed angular velocity obtaining section 32a obtains two crank angular velocities. Then, the low engine speed misfire determiner section 33a determines whether or not the misfire has occurred in the determination target cylinder based on the two crank angular velocities obtained by the low engine speed angular velocity obtaining section 32a.

On the other hand, in a case where the range determiner section 31 determines that the running state of the engine 1 lies in the determination range A1 and does not lie in the low engine speed range A2, namely lies in the range A3, the misfire determiner section 33 determines whether or not the misfire has occurred in the determination target cylinder, based on the two crank angular velocities obtained by the high engine speed angular velocity obtaining section 32b.

The low engine speed angular velocity obtaining section 32a obtains change rates over time in a first crank angular width $\Delta\varphi L$ at the two crank angular positions $\varphi 1L$, $\varphi 2L$, as the "crank angular velocities $\omega 1L$, $\omega 2L$". The two crank angular positions (two points at which the crank angular velocity is obtained) used by the low engine speed angular velocity obtaining section 32a will also be referred to as a "first crank angular position $\varphi 1L$ in the low engine speed state" and a "second crank angular position $\varphi 2L$ in the low engine speed state". The second crank angular position $\varphi 2L$ in the low engine speed state is retarded with respect to the first crank angular position $\varphi 1L$ in the low engine speed state. The crank angular velocity at the first crank angular position $\varphi 1L$ obtained in the low engine speed state will also be referred to as a "first crank angular velocity $\omega 1L$ in the low engine speed state", and the crank angular velocity at the second crank angular position $\varphi 2L$ obtained in the low engine speed state will also be referred to as a "second crank angular velocity $\varphi 2L$ in the low engine speed state".

The high engine speed angular velocity obtaining section 32b obtains change rates over time in a second crank angular width $\Delta\varphi H$ at the two crank angular positions $\varphi 1H$, $\varphi 2H$, as the "crank angular velocities $\omega 1H$, $\omega 2H$". The two crank angular positions (two points at which the crank angular velocity is obtained) used by the high engine speed angular velocity obtaining section 32b will also be referred to as a "first crank angular position $\varphi 1H$ in the high engine speed state" and a "second crank angular position $\varphi 2H$ in the high engine speed state". The second crank angular position $\varphi 2H$ in the high engine speed state is retarded with respect to the first crank angular position $\varphi 1H$ in the high engine speed state. The crank angular velocity at the first crank angular position $\varphi 1H$ obtained in the high engine speed state will also be referred to as a "first crank angular velocity $\omega 1H$ in the high engine speed state", and the crank angular velocity at the second crank angular position $\varphi 2H$ obtained in the high engine speed state will also be referred to as a "second crank angular velocity $\omega 2H$ in the high engine speed state".

In a case where "a change rate over time in a crank angular width $\Delta\varphi$ at a certain crank angular position $\varphi$ is derived", an end point of the crank angular width $\Delta\varphi$ is set to the crank angular position $\varphi$ and a start point of the crank angular width $\Delta\varphi$ is set to a crank angular position which is advanced with respect to the crank angular position $\varphi$ by the crank angular width $\Delta\varphi$. For example, in a case where a change rate over time in a crank angular width of 30 degrees at 10 degrees ATDC is derived, 20 degrees BTDC is set to the start point of the crank angular width, 10 degrees ATDC is set to the end point of this crank angular width, and 30 degrees is divided by time taken to change from 20 degrees BTDC into 10 degrees ATDC.

For this reason, the end point of the crank angular width $\Delta\varphi L$ used for the calculation of the first crank angular velocity $\varphi 1$ is set to a point between a range which is around the first TDC and a range which is around the second TDC (a point between a certain crank angular width including the first TDC and a certain crank angular width including the second TDC). In contrast, the start point of the crank angular width $\Delta\varphi L$ is set to a point between a range which is around the first TDC and a range which is around the second TDC, or set to a point which is advanced with respect to the first TDC and is outside the angular range between the range which is around the first TDC and the range which is around the second TDC. The second crank angular position $\varphi 2$ is retarded with respect to the first crank angular position $\varphi 1$. Therefore, the start point of the crank angular width $\Delta\varphi H$ used for the calculation of the second crank angular velocity $\omega 2$ is set to a point between a range which is around the first TDC and a range which is around the second TDC.

[Crank Angular Width $\Delta\varphi L$, $\Delta\varphi H$]

The first crank angular width $\Delta\varphi L$ is shorter than the second crank angular width $\Delta\varphi H$. For example, the first crank angular width $\Delta\varphi L$ is set to a crank angular width corresponding to the detection resolution $\varphi r$ of the crank angle sensor 7. In other words, the first crank angular width $\Delta\varphi 1$ is set to a crank angular width corresponding to one tooth of the rotor 15 of the crank angle sensor 7. In this case, the low engine speed angular velocity obtaining section 32a obtains the "instantaneous angular velocities" at the two crank angular positions $\varphi 1L$, $\varphi 2L$. For example, the second crank angular width $\Delta\varphi H$ is set to 90 degrees (crank angular width corresponding to 6 teeth of the rotor 15).

[Crank Angular Positions $\varphi 1L$, $\varphi 2L$ in Low Engine Speed State]

In the present embodiment, the first crank angular position $\varphi 1L$ in the low engine speed state is set to a point in a range which is around the first TDC, and the second crank angular position $\varphi 2L$ in the low engine speed state is set to a point in a range which is around the second TDC.

The two crank angular positions $\varphi 1L$, $\varphi 2L$ are set to crank angular positions at the timings which are before the timing when combustion in the next ignition cylinder affects the crank angular velocity. The phrase "the combustion affects the crank angular velocity" means that a combustion gas pressure generated by ignition and combustion of the air-fuel mixture contributes to push down of the piston, and thereby torque is provided to the crankshaft 5. By this torque, the rotation of the crankshaft 5 is accelerated. A timing when the combustion gas pressure starts to contribute to push down of the piston is varied depending on ignition timing, and is roughly 10 degrees ATDC (190 degrees ATDC with respect to the TDC of the determination target cylinder) with respect to the TDC of the next ignition cylinder. "A range which is around the second TDC" is an angular width assumed before the normal combustion performed in the next ignition cylinder starts to affect the crank angular velocity. 10 degrees ATDC is a suitable example of a limit on a retarded side, of "a range which is around the second TDC". In view of the above, the second crank angular position φ2L in the low engine speed state can be set to a crank angular position which is before 10 degrees ATDC with respect to the TDC of the next ignition cylinder, preferably a crank angular position which is 5 degrees ATDC or before 5 degrees ATDC.

The limit on the retarded side, of "a range which is around the second TDC" is not particularly limited. However, the combustion affects the crank angular velocity after the ignition timing, and there is a time lag between a time point when the ignition plug 14 generates a spark and a time point when the combustion affects the crank angular velocity. In light of this, the limit on the retarded side, of "a range which is around the second TDC" may be defined as a crank angular width after the ignition timing of the next ignition cylinder.

The first crank angular position φ 1L in the low engine speed state is set to the crank angular position which is the TDC or just after the TDC, among the crank angular positions which can be detected by the crank angle sensor 7. In the present embodiment, the first crank angular position φ 1L in the low engine speed state is set to 5 degrees ATDC. In the present embodiment, the second crank angular position φ2L in the low engine speed state is 185 degrees ATDC with respect to the TDC of the target determination cylinder.

[Crank Angular Positions φ1H, φ2H in Non-Low Engine Speed State]

In the present embodiment, the first crank angular position φ1H in the high engine speed state is set to a crank angular position different from the first crank angular position φ1L in the low engine speed state. For example, the first crank angular position φ1H in the high engine speed state is set to a crank angular position which is before (advanced with respect to) the first crank angular position φ 1L in the low engine speed state. The second crank angular position φ2H in the high engine speed state is set to a crank angular position which is closest to the second TDC. In the present embodiment, for example, the second crank angular position φ2H in the high engine speed state is 170 degrees ATDC. It is sufficient that the second crank angular width ΔφH is larger than the first crank angular width ΔφL. For example, the second crank angular width ΔφH is set to 90 degrees, 180 degrees, or 360 degrees.

[Misfire Determination Thresholds THL, THH]

The low engine speed misfire determination section 33a derives a deviation ΔωL between the two crank angular velocities ω1L, ω2L, and compares the deviation ΔωL to a low engine speed misfire determination threshold THL. For example, the deviation ΔωL is derived by subtracting the second crank angular velocity ω2L in the low engine speed state from the first crank angular velocity ω1L in the low engine speed state. The threshold THL is set to a positive value.

The low engine speed misfire determination section 33a determines that the misfire has occurred in the determination target cylinder in a case where the deviation ΔωL is equal to or greater than the threshold THL. In the same manner, the high engine speed misfire determination section 33b derives a deviation ΔωH between the two crank angular velocities ω1H, ω2H, and compares the deviation ΔωH to a high engine speed misfire determination threshold THH.

For example, the deviation ΔωH is derived by subtracting the second crank angular velocity ω2H in the high engine speed state from the first crank angular velocity ω1H in the high engine speed state. The threshold THH is set to a positive value.

The high engine speed misfire determination section 33b determines that the misfire has occurred in the determination target cylinder in a case where the deviation ΔωH is equal to or greater than the threshold THH. In the high engine speed range, the torque required to maintain the engine seed is relatively great. For this reason, a decrease in the crank angular velocity in a case where the torque cannot be generated due to the misfire is more in the high engine speed range than in the low engine speed range. In view of this, the high engine speed misfire determination threshold THH may be set greater than the low engine speed misfire determination threshold THL. By setting the threshold THH in this way, the normal combustion and the misfire can be accurately distinguished from each other.

[Misfire Determination Method]

Figure 9:
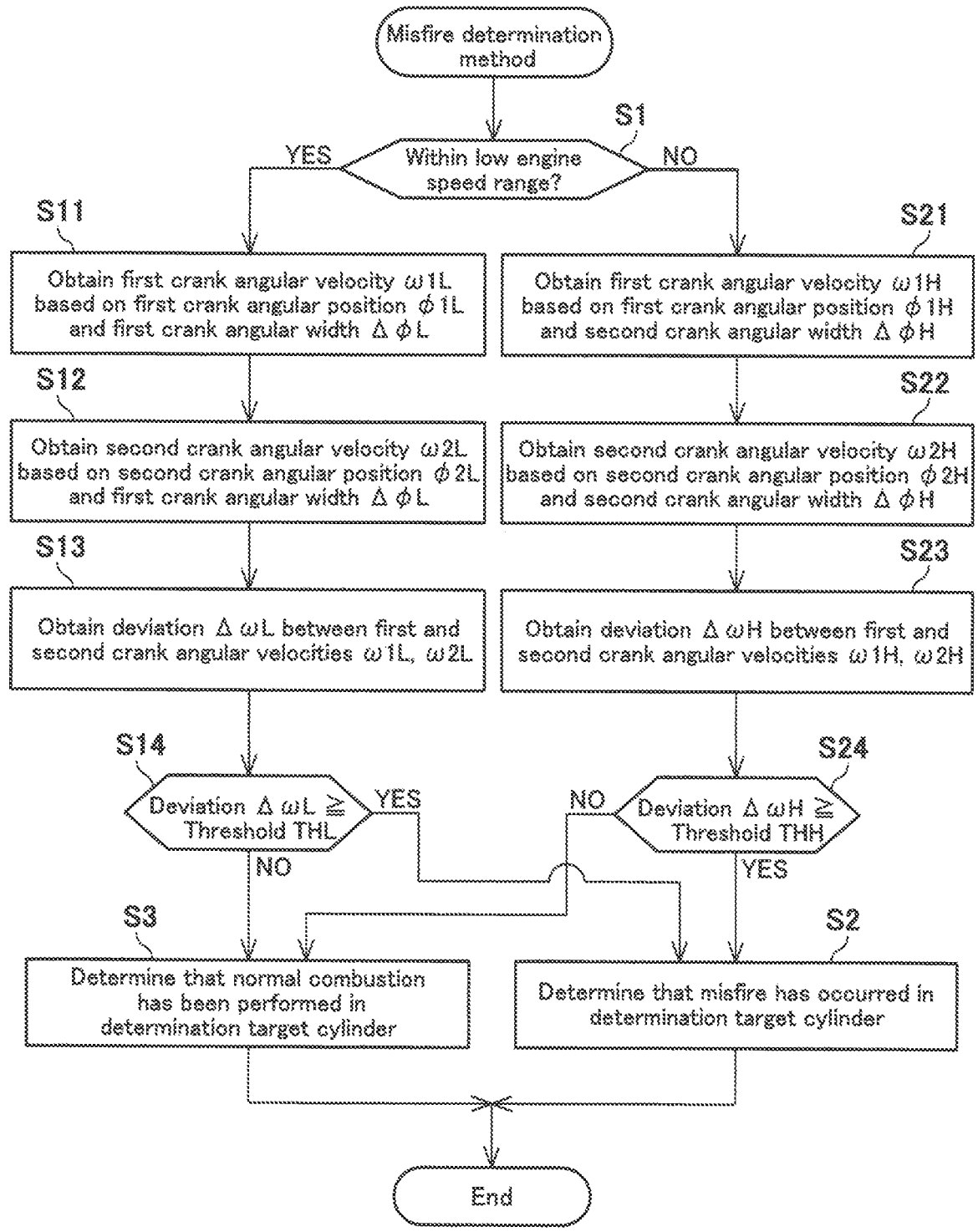
FIG. 9 is a flowchart showing a misfire determination method performed by the misfire determination device according to Embodiment 1.

The operations of the above-described functional blocks 32a, 32b, 33a, 33b will be described with reference to FIG. 9. Processing shown in FIG. 9 is executed repeatedly once in every predetermined sampling periods (e.g., every 5 ms) in a case where the running state of the engine 1 lies in the determination range A1. The range determiner section 31 determines whether or not the running state of the engine 1 lies in the low engine speed range A2 (S1).

In a case where the range determiner section 31 determines that the running state of the engine 1 lies in the low engine speed range A2 (S1: YES), the low engine speed angular velocity obtaining section 32a obtains the crank angular velocity in the first crank angular width ΔφL at the first crank angular position φ 1L in the low engine speed state, namely, the first crank angular velocity ω1L in the low engine speed state (S11). After that, the low engine speed angular velocity obtaining section 32a obtains the crank angular velocity in the first crank angular width ΔφL at the second crank angular position φ2L in the low engine speed state, namely, the second crank angular velocity ω2L in the low engine speed state (S12). Each of the first crank angular velocity ω1L in the low engine speed state and the second crank angular velocity ω2L in the low engine speed state is obtained at the crank angular position set between a range which is around the first TDC as the TDC of the determination target cylinder and a range which is around the second TDC as the TDC of the next ignition cylinder.

Then, the low engine speed misfire determination section 33a obtains the deviation ΔωL between the two crank angular velocities ω1L, ω2L (S13). Further, the low engine speed misfire determination section 33a compares the deviation ΔωL to the low engine speed misfire determination threshold THL (S14). In a case where the low engine speed misfire determination section 33a determines that the deviation ΔωL is equal to or greater than the threshold THL (S14: YES), the low engine speed misfire determination section 33a determines that the misfire has occurred in the determination target cylinder (S2). On the other hand, in a case where the low engine speed misfire determination section 33a determines that the deviation ΔωL is less than the threshold THL (S14: NO), the low engine speed misfire determination section 33a determines that the normal combustion has been performed in the determination target cylinder (S3).

In a case where the range determiner section 31 determines that the running state of the engine 1 does not lie in the low engine speed range A2 (S1: NO), the high engine speed angular velocity obtaining section 32b obtains the crank angular velocity in the second crank angular width ΔφH at the first crank angular position φ1H in the high engine speed state, namely, the first crank angular velocity ω1H in the high engine speed state (S21). Then, the high engine speed angular velocity obtaining section 32b obtains the crank angular velocity in the second crank angular width $\Delta\varphi H$ at the second crank angular position $\varphi 2H$ in the high engine speed state, namely, the second crank angular velocity $\omega 2H$ in the high engine speed state (S22).

Then, the high engine speed misfire determination section 33b obtains the deviation $\Delta\omega H$ between the two crank angular velocities $\omega 1H$, $\omega 2H$ (S23). Further, the high engine speed misfire determination section 33b compares the deviation $\Delta\omega H$ to the high engine speed misfire determination threshold THH (S24). In a case where the high engine speed misfire determination section 33b determines that the deviation $\Delta\omega H$ is equal to or greater than the threshold THH (S24: YES), the high engine speed misfire determination section 33b determines that the misfire has occurred in the determination target cylinder (S2). On the other hand, in a case where the high engine speed misfire determination section 33b determines that the deviation $\Delta\omega H$ is less than the threshold THH (S24: NO), the high engine speed misfire determination section 33b determines that the normal combustion has been performed in the determination target cylinder (S3).

Steps S11, S12, S21, S22 are the steps of obtaining the crank angular velocities at specified crank angular positions. Steps S13, S14, S23, S24 are the steps of comparing the crank angular velocities to the thresholds, respectively, to determine whether or not the misfire has occurred in the determination target cylinder, based on a result of the comparison.

[Operation]

The above-described misfire determination device 30 includes the angular velocity obtaining section 32 and the misfire determiner section 33. The angular velocity obtaining section 32 obtains the two crank angular velocities $\omega 1$, $\omega 2$, corresponding to the two crank angular positions $\varphi 1$, $\varphi 2$, respectively, which are set to the positions between a range which is around the first TDC as the TDC of the determination target cylinder, and a range which is around the second TDC as the TDC of the next ignition cylinder. The misfire determiner section 33 determines whether or not the misfire has occurred in the determination target cylinder, based on a result of comparing the deviation $\Delta\omega$ between the two crank angular velocities $\omega 1$, $\omega 2$ to the predetermined misfire determination threshold TH.

In accordance with the above-described configuration, the deviation $\Delta\omega$ between the two crank angular velocities $\omega 1$, $\omega 2$ is used to determine whether or not the misfire has occurred in the determination target cylinder, and the two crank angular velocities $\omega 1$, $\omega 2$ are obtained at the points between the range which is around the TDC of the determination target cylinder and the range which is around the TDC of the next ignition cylinder. This makes it possible to prevent a situation in which the combustion state of the cylinder which is other than the determination target cylinder affects the parameter (e.g., the crank angular velocity) used to determine whether or not the misfire has occurred in the determination target cylinder. In other words, the combustion state of the determination target cylinder affects more the parameter used to determine whether or not the misfire has occurred in the determination target cylinder. Therefore, accuracy of determination of whether or not the misfire has occurred in the determination target cylinder can be improved.

The misfire determination device 30 further includes the range determiner section 31 which determines whether or not the engine speed lies in the low engine speed range A2. The angular velocity obtaining section 32 includes the obtaining sections 32a, 32b. The misfire determiner section 33 includes the determiner sections 33a, 33b. In a case where the range determiner section 31 determines that the engine speed lies in the low engine speed range A2, the low engine speed angular velocity obtaining section 32a obtains crank angular change rates in the first crank angular width $\Delta\varphi L$, as the two crank angular velocities $\omega 1L$, $\omega 2L$. The low engine speed misfire determiner section 33a determines whether or not the misfire has occurred in the determination target cylinder, based on a result of comparing the deviation $\Delta\omega L$ between the two crank angular velocities $\omega 1L$, $\omega 2L$ to the predetermined low engine speed misfire determination threshold THL.

On the other hand, in a case where the range determiner section 31 determines that the engine speed does not lie in the low engine speed range A2, the high engine speed angular velocity obtaining section 32b obtains crank angular change rates in the second crank angular width $\Delta\varphi H$ longer than the first crank angular width $\Delta\varphi L$, as the two crank angular velocities $\omega 1H$, $\omega 2H$. The high engine speed misfire determiner section 33b determines whether or not the misfire has occurred in the determination target cylinder, based on a result of comparing the deviation $\Delta\omega H$ between the two crank angular velocities $\omega 1H$, $\omega 2H$ to the high engine speed misfire determination threshold THH.

In the low engine speed range A2, the crank angular width $\Delta\varphi L$ used for the calculation of the two crank angular velocities $\omega 1L$, $\omega 2L$ is set relatively shorter. This makes it possible to eliminate the effects of the non-uniformity of the crank angular velocities before the TDC of the determination target cylinder. As a result, misfire determination accuracy can be improved. The non-uniformity of the crank angular velocities is less in the non-low engine speed range than in the low engine speed range. Therefore, even in a case where the crank angular width $\Delta\varphi H$ used for the calculation of the two crank angular velocities $\omega 1H$, $\omega 2H$ is set longer, it becomes possible to prevent a reduction of the detection accuracy due to the non-uniformity of the crank angular velocities before the TDC of the determination target cylinder. Also, even when the crank angular velocity increases by setting the crank angular width $\Delta\varphi H$ for the high-engine speed range longer, the crank angular velocity can be calculated more accurately than that in the low engine speed range, without excessively increasing sampling time and detection accuracy. In this way, for both of the low engine speed range and the non-low engine speed range, dominant factors which may affect a reduction of accuracy are dealt with. As a result, the determination accuracy over the whole engine speed range can be improved.

In a case where the normal combustion is performed in the determination target cylinder, the crank angular velocity after ignition and combustion in the determination target cylinder is affected by the crank angular velocity before the ignition and the combustion. If the crank angular velocity before the first TDC is high, the crank angular velocity after the ignition and the combustion is also high. If the crank angular velocity before the first TDC is low, the crank angular velocity after the ignition and the combustion is also low. A time point which is relatively close to and before the first TDC is handled as the "range which is around the first TDC". The "range which is around the first TDC" may be set to the ignition timing of the determination target cylinder, or a range after 20 degrees BTDC. Preferably, the "range which is around the first TDC" may be set to a range which is around 10 degrees BTDC. In the present embodiment, the first crank angular positions $\varphi 1L$, $\varphi 1H$ are set to the positions in the "range which is around the first TDC", and the second crank angular positions φ2L, φ2H are set to positions in the "range which is around the second TDC" (see FIG. 2).

In a case where the ignition timing of the determination target cylinder is referred to the first ignition timing, and the ignition timing of the next ignition cylinder is the second ignition timing, the first crank angular position and the second crank angular position are set to the positions which are before a period in which the combustion in the next ignition cylinder affects the crank angular velocity, more specifically, between a range which is around the first TDC and a range which is around the second TDC. For example, the first crank angular position and the second crank angular position may be 185 degrees ATDC after the second TDC. In some cases, the effects of the combustion in the next ignition cylinder are delayed depending on the effects of inertia energy or a low detection resolution, or a case where the second ignition timing is retarded with respect to the second TDC. The crank angular velocity is calculated by measuring time taken for the crankshaft 5 to be angularly displaced by the crank angular width from a predetermined reference position. For this reason, there is a time lag between a time point when the ignition occurs and a time point when the crank angular velocity changes due to the ignition. In this case, the timing when the crank angular velocity changes due to the effects of the combustion in the next ignition cylinder may be set to a crank angular position which is a sum of the second ignition timing and a predetermined time lag.

The range which is around the first TDC is set to a range after the timing (hereinafter this will be referred to as "first ignition affecting timing") when the combustion in the determination target cylinder affects the change in the crank angular velocity. In a case where the normal combustion is performed in the determination target cylinder, the crank angular velocity after the ignition and the combustion in the determination target cylinder is affected depending on the crank angular velocity before the ignition and the combustion in the determination target cylinder. In view of thus, the range which is around the first TDC may be set to a range before the first ignition timing.

The second crank angular width is preferably set to a width less than 180 degrees. This makes it possible to prevent a situation in which the effects of the combustion performed before the combustion in the determination target cylinder affects the parameter used for the determination/calculation.

Regarding the low engine speed range, for example, if the normal combustion has occurred in the determination target cylinder, the first crank angular position and the second crank angular position are set to points after the crank angular position at which the normal combustion will affect the crank angular velocity. For this reason, regarding at least the low engine speed range, the misfire determiner section 33 determines whether or not the misfire has occurred in the determination target cylinder based on the information obtained after the first ignition timing. Regarding the high engine speed range, the misfire determiner section 33 determines whether or not the misfire has occurred in the determination target cylinder based on the information obtained before the first ignition timing. For example, if the normal combustion has occurred in the determination target cylinder, the first crank angular position is set to a point before the crank angular position at which the normal combustion will affect the crank angular velocity.

Regarding the low engine speed range, the crank angular width used to derive the instantaneous angular velocity is set to a minimum width, and thus a time interval between the first crank angular position and the second crank angular position can be increased. By setting the crank angular width to the minimum width, the first crank angular position can be close to the first TDC. By setting the crank angular width to the minimum width, the second crank angular position can be close to the second TDC. By making the time points of the two crank angular positions apart from each other as described above, the effects of a reduction of the crank angular velocity due to occurrence of the misfire can be increased. As a result, the accuracy of the misfire determination for the low engine speed range can be improved.

Regarding the high engine speed range, to increase the time interval between the first crank angular position and the second crank angular position, the start point of the crank angular width in a case where the engine speed lies in the high engine speed range is advanced with respect to the start point of the crank angular width in a case where the engine speed lies in the low engine speed range, and further the crank angular width is increased. By making the time points of the two crank angular positions apart from each other as described above, the effects of a reduction of the crank angular velocity due to occurrence of the misfire can be further increased. As a result, the accuracy of the misfire determination for the high engine speed range can be further improved.

Embodiment 2

Embodiment 2 is different from Embodiment 1 in that the second crank angular position in the low engine speed state is advanced with respect to the second TDC. Hereinafter, this will be described.

With reference to FIG. 7, in the normal combustion state, the crank angular velocity is highest in a range which is around 140 degrees ATDC, in a range between the TDC of the cylinder in which the normal combustion has been performed and the TDC of the cylinder in which the ignition is performed next. With reference to FIG. 8, in the range which is around 140 degrees ATDC, a difference between the angular velocity deviation in the misfire state and the angular velocity deviation in the normal combustion state is largest.

Figure 10:
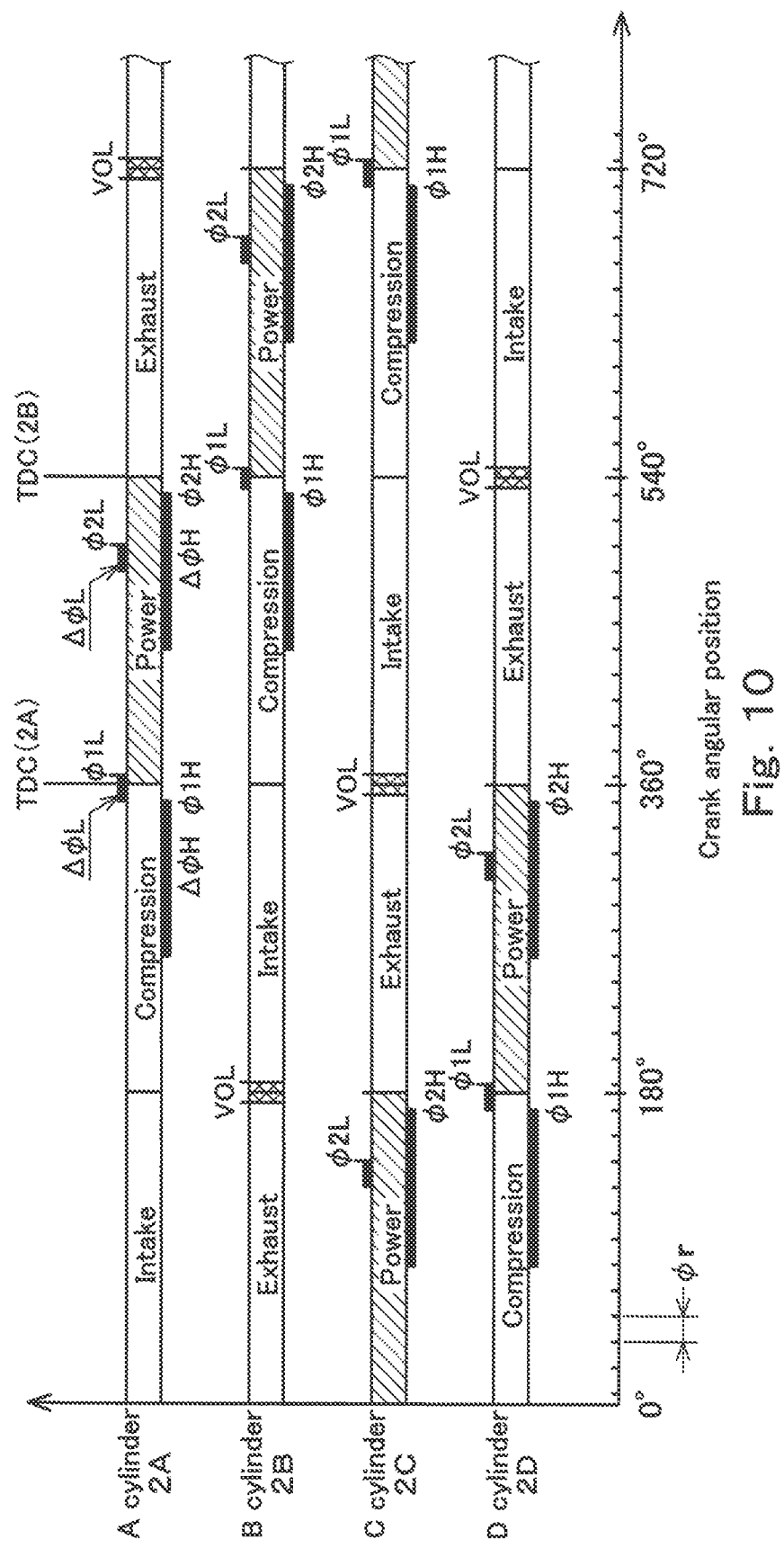
FIG. 10 is a graph showing a first crank angular position in a low engine speed state and a second crank angular position in the low engine speed state according to Embodiment 2.

As shown in FIG. 10, in the present embodiment, the second crank angular position φ2L in the low engine speed state is set to a point in a range which is around 140 degrees ATDC. In other words, the second crank angular position φ2L in the low engine speed state is set to a point which is close to the crank angular position at which the crank angular velocity is highest in a case where the normal combustion is performed in the determination target cylinder, the point being in a range between the first TDC and the second TDC. In other words, the second crank angular position φ2L in the low engine speed state is set to a point which is close to a crank angular position at which a difference between an angular velocity deviation with respect to the crank angular velocity at the first TDC in a case where the normal combustion has been performed in the determination target cylinder and an angular velocity deviation with respect to the crank angular velocity at the first TDC in a case where the misfire has occurred in the determination target cylinder, is largest, the point being in a range between the first TDC and the second TDC.

By setting the second crank angular position φ2L in the low engine speed state to the above-described crank angular position, the threshold used to accurately distinguish between the normal combustion and the misfire can be easily set, and the accuracy of the misfire determination can be improved.

Modified Example

So far, the embodiments of the present invention have been described. The present invention is not limited to the above-described embodiment. The above-described configuration may be changed, added to or deleted from, within a scope of the spirit of the preset invention.

For example, in the above-described embodiments, the crank angular velocity obtained in the low engine speed state is the "instantaneous angular velocity. The crank angular width used to derive the "instantaneous angular velocity" is not limited to the detection resolution φr (angular width of one tooth of the rotor 15). The crank angular width used to derive the crank angular velocity obtained in the low engine speed state may be an angular width of multiple tenth of the rotor. In this case, also, the crank angular width used to derive the crank angular velocity obtained in the low engine speed state is preferably shorter than the crank angular width used to derive the crank angular velocity obtained in the high engine speed state. In a case where the crank angular width of multiple teeth is used, the start point and end point of the crank angular width used to derive the crank angular velocity obtained in the low engine speed state are preferably set to the points in a range between a range which is around the first TDC and a range which is around the second TDC. In contrast, one of the start point and end point of the crank angular width for the high engine speed state may outside the range between the range which is around the first TDC and the range which is around the second TDC.

Although the misfire determiner section 33 determines whether or not the misfire has occurred in the determination target cylinder based on the deviation between the two crank angular velocities in a case where the engine speed lies in the high engine speed range, other misfire determination methods may be used so long as the crank angular velocities are derived by use of the crank angular width longer than that in a case where the engine speed lies in the low engine speed range. For example, the misfire determination device may determine that the misfire has occurred in the determination target cylinder in a case where the crank angular velocity is lower than an average of the crank angular velocities by a predetermined value or more, rather than a case where the deviation between the two crank angular velocities is equal to or greater than the threshold.

Although the two crank angular positions (the points at which the two crank angular velocities are obtained) are set to points between the range which is around the first TDC and the range which is around the second TDC, based on the angular positions (piston positions), the two crank angular positions may be set based on the ignition timings. The ignition timings are sometimes shifted with respect to the TDC, depending on the engine speed, the throttle valve opening degree, or the like. The two crank angular positions may be set in view of the shift of the ignition timings. If the ignition timings are varied in a case where the shift of the ignition timings is not considered, the two crank angular positions may be set to the timings which are after a period in which the effects of the combustion in the determination target cylinder are provided and before a period in which the effects of the combustion in the next ignition cylinder are provided.

The engine 1 for which the misfire determination device 30 performs the determination is not limited to the four-cylinder engine. For example, the misfire determination device 30 may be applied to a single-cylinder engine, or multi-cylinder engines including two or three cylinders. Further, the engine 1 is not limited to the engine in which explosion occurs at equal intervals, and may be applied to an engine in which explosion occurs at unequal (irregular) intervals. The cylinders may be arranged in series or in V-shape.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A misfire determination device of an internal combustion engine, the misfire determination device comprising:
    an angular velocity obtaining section which obtains two crank angular velocities corresponding to two crank angular positions, respectively, which are set between a range which includes a first compression top dead center and a range which includes a second compression top dead center, in which the first compression top dead center is a compression top dead center of a determination target cylinder, and the second compression top dead center is the compression top dead center of a next ignition cylinder in which ignition is performed next to the ignition performed in the determination target cylinder;
    a misfire determination section which determines whether or not misfire has occurred in the determination target cylinder based on a result of comparing a deviation between the two crank angular velocities to a predetermined misfire determination threshold; and
    a range determiner section which determines whether or not an engine speed lies in a low engine speed range,
    wherein in a case where the range determiner section determines that the engine speed lies in the low engine speed range,
    the angular velocity obtaining section obtains crank angle change rates in a first crank angular width, as the two crank angular velocities, and
    the misfire determination section determines whether or not the misfire has occurred in the determination target cylinder, based on a result of comparing the deviation between the two crank angular velocities to a predetermined low engine speed misfire determination threshold, and
    wherein in a case where the range determiner section determines that the engine speed does not lie in the low engine speed range,
    the angular velocity obtaining section obtains crank angle change rates in a second crank angular width longer than the first crank angular width, as the two crank angular velocities, and
    the misfire determination section determines whether or not the misfire has occurred in the determination target cylinder, based on a result of comparing the deviation between the two crank angular velocities to a predetermined high engine speed misfire determination threshold.

2. The misfire determination device of the internal combustion engine according to claim 1, wherein the angular velocity obtaining section obtains the two crank angular velocities based on information obtained after the first compression top dead center.

3. The misfire determination device of the internal combustion engine according to claim 1,
   wherein the two crank angular positions include a first crank angular position and a second crank angular position which is retarded with respect to the first crank angular position, and
   wherein the second crank angular position is set to a point in the range which includes the second compression top dead center.

4. The misfire determination device of the internal combustion engine according to claim 1,
   wherein the two crank angular positions include a first crank angular position and a second crank angular position which is retarded with respect to the first crank angular position, and
   wherein the second crank angular position is set to a point which is close to the crank angular position at which the crank angular velocity is highest in a case where normal combustion has been performed in the determination target cylinder, the point being in a range between the first compression top dead center and the second compression top dead center.

5. The misfire determination device of the internal combustion engine according to claim 1,
   wherein the two crank angular positions include a first crank angular position and a second crank angular position which is retarded with respect to the first crank angular position, and
   wherein the first crank angular position is set to a point in the range which includes the first compression top dead center.

6. The misfire determination device of the internal combustion engine according to claim 1,
   wherein each of the two crank angular velocities is derived as a change over time of the crank angular position, for passage of a minimum crank angular width according to a detection resolution.

7. The misfire determination device of the internal combustion engine according to claim 1,
   wherein the range which includes the first compression top dead center is from the first compression top dead center minus 20 degrees to the first compression top dead center plus 20 degrees, and
   wherein the range which includes the second compression top dead center is from the second compression top dead center minus 20 degrees to the second compression top dead center plus 20 degrees.

8. A misfire determination method of an internal combustion engine, the misfire determination method comprising:
   determining whether or not an engine speed lies in a low engine speed range;
   obtaining two crank angular velocities corresponding to two crank angular positions, respectively, which are set between a range which includes a first compression top dead center and a range which includes a second compression top dead center, in which the first compression top dead center is a compression top dead center of a determination target cylinder, and the second compression top dead center is the compression top dead center of a next ignition cylinder in which ignition is performed next to the ignition performed in the determination target cylinder; and
   determining that misfire has occurred in the determination target cylinder in a case where a deviation between the obtained two crank angular velocities is equal to or greater than a predetermined misfire determination threshold,
   wherein in a case where the engine speed is determined to lie in the low engine speed range:
      crank angle change rates in a first crank angular width are obtained as the two crank angular velocities, and
      whether or not the misfire has occurred in the determination target cylinder is determined based on a result of comparing the deviation between the two crank angular velocities to a predetermined low engine speed misfire determination threshold, and
   wherein in a case where the engine speed is determined not to lie in the low engine speed range:
      crank angle change rates in a second crank angular width longer than the first crank angular width are obtained as the two crank angular velocities, and
      whether or not the misfire has occurred in the determination target cylinder is determined based on a result of comparing the deviation between the two crank angular velocities to a predetermined high engine speed misfire determination threshold.

9. The misfire determination method according to claim 8,
   wherein the range which includes the first compression top dead center is from the first compression top dead center minus 20 degrees to the first compression top dead center plus 20 degrees, and
   wherein the range which includes the second compression top dead center is from the second compression top dead center minus 20 degrees to the second compression top dead center plus 20 degrees.

* * * * *